United States Patent Office 3,560,434
Patented Feb. 2, 1971

3,560,434
ENHANCEMENT OF RESISTANCE OF OLEFIN POLYMERS TO COPPER-CATALYZED OXIDATIVE DEGRADATION
Charles Abramoff, New York, N.Y., assignor to Argus Chemical Corporation, Brooklyn, N.Y., a corporation of Delaware
No Drawing. Continuation-in-part of application Ser. No. 739,636, June 25, 1968. This application Dec. 12, 1969, Ser. No. 884,711
Int. Cl. C08f 45/58, 45/60
U.S. Cl. 260—45.8                    19 Claims

ABSTRACT OF THE DISCLOSURE

Compositions are provided which are useful in the enhancement of the resistance of olefin polymers to copper-catalyzed oxidative deterioration, consisting essentially of 3-amino-1,2,4-triazole and pentaerythritol, and optionally, at least one olefin polymer stabilizer. Olefin polymer compositions, such as propylene polymer compositions, containing such compositions, and a process for enhancing the resistance of olefin polymers to copper-catalyzed degradation by incorporation of such compositions, are also provided.

---

This application is a continuation-in-part of application Ser. No. 739,636, filed June 25, 1968, now abandoned.

This invention relates to compositions useful in the enhancement of the resistance of olefin polymers, such as propylene polymers, to copper-catalyzed oxidative deterioration, consisting essentially of 3-amino-1,2,4-triazole and pentaerythritol, and optionally, at least one olefin polymer stabilizer, and to olefin polymer compositions having an enhanced resistance to copper-catalyzed degradation in physical properties due to incorporation therein of the above compositions, and to a process of enhancing the resistance of olefin polymers to copper-catalyzed degradation by incorporation of such compositions.

Polypropylene is a tough, hard, relatively flexible, high-melting polymeric material, and thus has a number of important applications, such as, for example, as electrical insulation for copper wires and cables. However, in several respects the stability of polypropylene leaves much to be desired. The polymer shows a tendency to decrease rapidly in melt viscosity and then to become brittle when kept at elevated temperatures for the time required in milling, calendering, extrusion, injection molding, and fiber forming equipment. This deterioration is particularly serious when the polymers are worked in a molten state in the presence of oxygen, for example, air. It is known in the art that degradation in one or more physical properties of polypropylene due to heat can be inhibited by the incorporation of a number of well known thermal antioxidants, including hindered phenols, secondary aromatic amines, organic phosphites, and thiodipropionic acid esters.

A special problem is presented when the polypropylene is contaminated by or is used in contact with copper. Thus, polypropylene employed as insulation for copper wires and cables becomes useless after a few months. In fact, it has been found that oxidative degradation of polypropylene occurs at an extremely rapid rate in the presence of copper, even when the polymer contains effective antioxidants. Hansen et al., Journal of Polymer Science, Part A, 2, 587–609 (1964), report at page 589 that "The catalytic effect of copper on the thermal oxidation of polypropylene is not as drastic in the *absence* of antioxidants as it is in their presence" (emphasis added). Where polypropylene contains an antioxidant, in the presence of copper "the rate of oxidation becomes rapid and constant after a drastically shortened induction period compared with that obtained in the absence of copper." (page 590). "The induction period in oxygen at 140° C. for polypropylene stabilized by the addition of 0.5 weight percent of 4,4'-thiobis(3-methyl-6-tert-butylphenol) is decreased from about 400 hours to 40 hours by the presence of copper. Similar 90% losses in the effectiveness of this antioxidant in the presence of copper have been observed over a range of temperatures." (page 591).

To inhibit copper-catalyzed oxidation, conventional copper chelating agents and metal deactivators have been added to polypropylene compositions containing thermal antioxidants. As reported by Hansen et al., supra, at page 593, "All of these materials were found to be unsatisfactory for a variety of reasons. Most of them did not diminish the catalytic activity of copper and copper compounds. Some actually accelerated the already rapid copper-catalyzed oxidation of polypropylene, and might be useful in other reactions where oxidation is sought rather than avoided. The best of the conventional deactivators (for example N,N'-di-β-naphthyl - p - phenylenediamine) were only slightly effective in curtailing the catalytic activity of copper." It is also reported that other conventional and commercial metal inhibitors or deactivators, such as ethylenediamine tetraacetic acid and its salts, 2,2'-bipyridyl, 8-quinolinol, N,N'-disalicylidene-1,2-propanediamine, and benzimidazole, either were ineffective or only slightly effective, and usually had other disadvantages, including instability, incompatibility, water-solubility, volatility, formation of highly colored products, and reaction with other components of the polypropylene composition.

Hansen et al., Polymer Engineering and Science, vol. 5, October 1965, pages 223 to 226, reported that nitrobenzohydrazides, oxalyldihydrazide and its derivatives, triazines, triazoles, including 3-amino-1,2,4-triazole, triazolines, and tetrazoles, are effective copper inhibitors.

British patent No. 882,037 to Du Pont teaches that the resistance of polyolefins to thermal and oxidative degradation can be enhanced by incorporating in the polyolefins an aliphatic, non-polymeric polyol containing at least three alcoholic hydroxyl groups, such as pentaerythritol, and a phenolic antioxidant.

In accordance with the instant invention, stabilized systems for olefin polymers are provided consisting essentially of a combination of a 3-amino-1,2,4-triazole and pentaerythritol, and optionally, at least one olefin polymer stabilizer, to substantially reduce and in many cases overcome any depreciative effect of copper on the olefin polymer stabilizer or olefin polymer.

In the presence of the combination of 3-amino-1,2,4-triazole and pentaerythritol, the usual catalytic effect of copper on the rate of degradation of the olefin polymer is not observed, and instead, the olefin polymer displays a resistance to degradation, enhanced by the usual olefin polymer stabilizer or stabilizer system, that is virtually as high as though the copper were not present. This is especially surprising in view of the fact that copper substantially reduces the effectiveness of most commercially available antioxidants in olefin polymers, even when so called conventional "copper deactivators" are incorporated in the polymer.

When taken alone, the 3-amino-1,2,4-triazole and the pentaerythritol each are capable only of mildly inhibiting the catalytic effect of copper on the rate of degradation of olefin polymers. However, the combination of 3-amino-1,2,4-triazole and pentaerythritol give an enhanced resistance to the usual catalytic effect of copper on the rate of degradation of the olefin polymer which is far greater than and not obtainable from each alone, suggesting that each component synergizes the effectiveness of the other.

In addition, in accordance with the invention, olefin polymer compositions are provided, such as propylene polymer compositions, consisting essentially of olefin polymer, a combination of 3-amino-1,2,4-triazole and pentaerythritol. Such olefin polymer compositions of the invention containing a combination of 3-amino-1,2,4-triazole and pentaerythritol can be used in contact with copper, and can be combined with the usual olefin polymer stabilizers to enhance their resistance to oxidative deterioration.

Also in accordance with the invention, olefin polymer compositions are provided that include, in addition to the olefin polymer, 3-amino-1,2,4-triazole and pentaerythritol, at least one olefin polymer stabilizer. Such stabilizers can be any of the stabilizers known to enhance the resistance of olefin polymers to oxidative deterioration.

Further in accordance with the instant invention, a process for enhancing the resistance of olefin polymers, such as propylene polymers, to copper-catalyzed oxidative deterioration is provided, which comprises incorporating in the olefin polymer a combination of 3-amino-1,2,4-triazole and pentaerythritol, and optionally, at least one olefin polymer stabilizer.

The olefin polymer stabilizers which can be employed in the invention include, for instance, phenols, organic phosphites, thiodipropionic acid esters, polyvalent metal salts of organic acids, and hydrocarbon sulfides and polysulfides, and conventional olefin polymer light stabilizers as will be seen hereinafter.

3 - amino - 1,2,4 - triazole exists in several tautomeric forms of the structure:

$$\begin{array}{c} HN\text{———}N \\ | \quad\quad \| \\ HC\quad\;\; C\text{—}NH_2 \\ \diagdown\!\!\diagup \\ N \end{array}$$

One tautomer may be referred to as 5-amino-1,2,4-triazole. It is not known which of the tautomers of 3-amino-1,2,4-triazole. It is not known which of the tautomers of 3-amino-1,2,4-triazole are effective for the purposes of the invention; perhaps all are. In any case, inasmuch as these co-exist in tautomeric equilibrium, any form of 3-amino-1,2,4-triazole can be used.

Pentaerythritol also exists in polymeric forms; e.g. dipentaerythritol, tripentaerythritol, etc. Any pentaerythritol having the structural unit, $$HO\text{—}\left[CH_2\text{—}\underset{\underset{CH_2OH}{|}}{\overset{\overset{CH_2OH}{|}}{C}}\text{—}CH_2O\text{—}\right]_n H$$

is effective. $n$ is an integer from about 1 to about 3.

The organic phosphite can be any organic phosphite having one or more organic radicals attached to phosphorus through oxygen or sulfur. These radicals can be monovalent radicals in the case of the triphosphites, diphosphites and monophosphites, which can be defined by the formula:

$$R_1\text{—}A\text{—}\underset{\underset{R_2}{\overset{\overset{A}{|}}{|}}}{P}\text{—}A\text{—}R_3$$

in which $R_1$, $R_2$ and $R_3$ are selected from the group consisting of hydrogen, alkyl, alkenyl, aryl, alkaryl, aralkyl, and cycloalkyl groups having from one to about thirty carbon atoms and A is oxygen or sulfur.

Also included are the organic phosphites having a bivalent organic radical forming a heterocyclic ring with the phosphorus of the type:

$$R_4\diagdown\!\!\overset{O}{\diagup}\;\;P\text{—}O\text{—}R_5 \atop \diagup\!\!\underset{O}{\diagdown}$$

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$.

Also useful in the compositons of the invention are mixed heterocyclic-open chain phosphites of the type:

$$R_4\diagdown\!\!\overset{O}{\diagup}\;P\text{—}O\text{—}R_4\text{—}O\text{—}P\;\diagup\!\!\overset{O}{\diagdown}\;R_4 \atop \diagup\!\!\underset{O}{\diagdown}\quad\quad\quad\quad\quad\diagdown\!\!\underset{O}{\diagup}$$

More complex phosphites are formed from trivalent organic radicals, of the type:

$$R_6\text{—}O\text{—}P\overset{O}{\underset{O}{\diagdown\!\!\diagup}}\quad HO\text{—}R_6\overset{O}{\underset{O}{\diagdown\!\!\diagup}}P\text{—}O\text{—}R_6\overset{O}{\underset{O}{\diagdown\!\!\diagup}}P\text{—}O\text{—}R_6\overset{OH}{\diagdown\!\!\diagup}OH$$

in which $R_6$ is a trivalent organic radical of any of the types of $R_1$ to $R_5$, inclusive, as defined above.

An especially preferred class of organic phosphites have a polycyclic aromatic group attached to phosphorus through oxygen, with no or one or more phenolic hydroxyl groups on either or both of the aromatic rings. These phosphites are characterized by the formula:

$$(HO)_m\text{—}Ar\text{—}O\text{—}P\diagup\!\!\overset{O\text{—}}{\diagdown\!\!\underset{O\text{—}}{}}Z$$

in which Ar is a polycyclic aromatic nucleus and $m$ is an interger of from 0 to about 5. Z is one or a plurality of organic radicals as defined above for $R_1$ to $R_6$, taken singly or together in sufficient number to satisfy the valences of the two phosphite oxygen atoms. Z can also be hydrogen, and can include additional polycyclic aromatic groups of the type $(HO)_m\text{—}Ar$.

The term "organic phosphite" as used herein is inclusive of the above-described mono-, di- and triphosphites. Usually, the phosphite will not have more than about sixty carbon atoms.

Exemplary are monophenyl di-2-ethylhexyl phosphite,
diphenyl mono-2-ethylhexyl phosphite,
di-isooctyl monotolyl phosphite,
tri-2-ethylhexyl phosphite,
phenyl dicyclohexyl phosphite,
phenyl diethyl phosphite,
triphenyl phosphite,
tricresyl phosphite,
tri(dimethylphenyl) phosphite,
tri-octadecyl phosphite,
triisooctyl phosphite,
tridodecyl phosphite,
isooctyl diphenyl phosphite,
diisooctyl phenyl phosphite,
tri(t-octylphenyl) phosphite,
tri(t-nonylphenyl) phosphite,
benzyl methyl isopropyl phosphite,
butyl dicresyl phosphite,
isoocytyl di(octylphenyl) phosphite,
di(2-ethylhexyl) (isooctylphenyl) phosphite,
isooctyl diphenyl thio-phosphite,
trithiolauryl phosphite,
tri(2-cyclohexylphenyl) phosphite,
tri-α-naphthyl phosphite,
tri(phenylphenyl) phosphite,
tri(2-phenyl ethyl) phosphite,
monododecyl phosphite,
di(p-tert-butyl phenyl) phosphite,
decyl phenyl phosphite,
tert-butyl-phenyl 2-ethylhexyl phosphite,
ethylene phenyl phosphite,
ethylene t-butyl phosphite,
ethylene isohexyl phosphite, ethylene isooctyl phosphite,
ethylene cyclohexyl phosphite,
2-phenoxy-1,3,2-dioxaphosphorinane,
2-butoxy-1,3,2-dioxaphosphorinane,
2-octoxy-5,5-dimethyl dioxaphosphorinane,
2-cyclohexyloxy-5,5-diethyl dioxaphosphorinane,
monophenyl phosphite,
2-ethylhexyl phosphite,
isooctyl phosphite,
cresyl phosphite,
t-octylphenyl phosphite,
t-butyl phosphite,
diphenyl phosphite,
diisooctyl phosphite,
dicresyl phosphite,
dioctylphenyl phosphite,
didodecyl phosphite,
di-α-naphthyl phosphite,
ethylene phosphite,
butyl cresyl phosphite,
phenyl-mono-2-ethylhexyl phosphite,
isooctyl monotolyl phosphite and
phenyl cyclohexyl phosphite.

Exemplary of the poly aryl phosphites are:

bis(4,4'-thio-bis(2-tertiary butyl-5-methyl-phenol)) isooctyl phosphite,
mono(4,4'-thio-bis(2-tertiary-butyl-5-methyl-phenol)) di-phenyl phosphite,
tri-(4,4'-n-butylidene-bis(2-tertiary-butyl-5-methyl-phenol)) phosphite,
4,4'-benzylidene-bis(2-tertiary-butyl-5-methyl-phenol)) diphenyl phosphite,
isooctyl 2,2'-bis(-parahydroxyphenyl) propane phosphite,
tri-decyl 4,4'n-butylidene-bis(-2-tertiary butyl-5-methyl-phenol) phosphite,
4,4'-thiobis(2-tertiary butyl-5-methylphenol) phosphite,
2-ethylhexyl-2,2'-methylene-bis(4-methyl-6-1'-methylcyclohexyl) phenol phosphite,
tri(-2,2'-bis-(parahydroxy phenyl) propane) phosphite,
tri(4,4'-thiobis(2-tertiary-butyl-5-methyl-phenol)) phosphite,
isooctyl-(2,6-bis(2'-hydroxy-3,5-dinonylbenzyl)-4-nonyl phenyl)) phosphite,
tetra-tridecyl 4,4'n-butylidene-bis(2-tertiary butyl-5-methyl phenyl) diphosphite,
tetra-isooctyl 4,4'-thiobis(2-tertiary-butyl-5-methyl phenyl) diphosphite,
2,2'-methylene-bis(4-methyl 6-1'-methyl cyclo-hexyl phenyl) polyphosphite,
isooctyl-4,4'-isopropylidene-bis-phenyl-polyphosphite,
2-ethylhexyl-2,2-methylene-bis(4-methyl-6,1'-methyl-cyclohexyl)phenyl triphosphite,
tetra-tridecyl-4,4'-oxydiphenyl diphosphite,
tetra-n-dodecyl-4,4'-n-butylidenebis (2-tertiary-butyl-5-methylphenyl)diphosphite,
tetra-tridecyl-4,4'-isopropylidene bisphenyl diphosphite,
tri-tridecyl butane-1,1,3-tris(2'-methyl-5'-tertiary-butyl-phenyl-4'-) triphosphite.

The phenol stabilizers contain one or more phenolic hydroxyl groups, and one or more phenolic nuclei and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

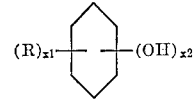

R is selected from the group consisting of hydrogen, halogen, and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

Polycyclic phenols include aromatic nuclei which are linked by a bivalent linking radical, and are defined by the formula:

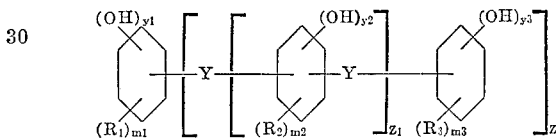

wherein $R_1$, $R_2$ and $R_3$ are inert substituent groups of the type of R above; Y is a polyvalent linking radical, $m_1$ is an integer from zero to a maximum of $5-(z_2+y_1)$; $m_2$ can be an integer from zero to three and $m_3$ an integer from zero to four, $z_1$ can be an integer from zero to about six and $z_2$ an integer from one to five, preferably one. Preferably, the hydroxyl grouups in polycyclic phenols are located ortho and/or para to Y. There can be one or more hydroxyl groups per phenyl nucleus, $y_1$, $y_2$ and $y_3$ representing the number thereof. Preferably, there will be only one hydroxyl group per phenyl nucleus. The phenolic hydroxyl may be either hindered, i.e., substituted in both positions ortho to the hydroxyl group, or partially hindered or unhindered, i.e., substituted in one or neither position.

Y can be a single bond, as in diphenyl, or a bivalent group, such as:

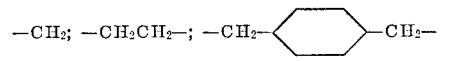

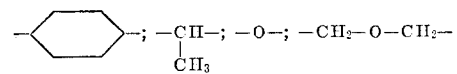

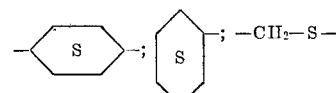

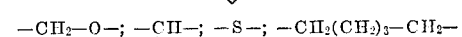

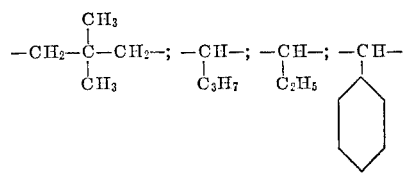

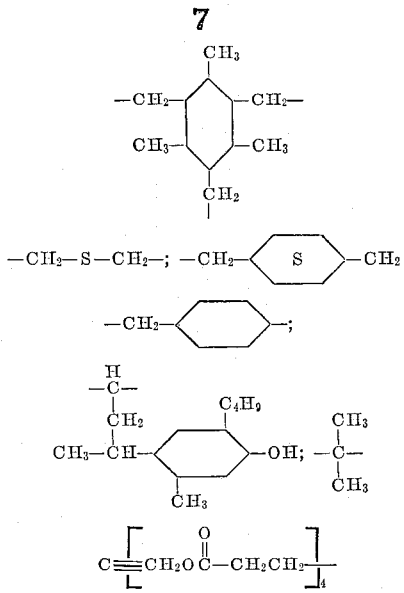

Representative phenols include guaiacol, resorcinol monoacetate, vanillin, butyl salicylate, 2,6-ditert-butyl-4-methyl phenol, 2-tert-butyl - 4 - methoxy phenol, 2,4-dinonyl phenol, 2,3,4,5-tetradecyl phenol, tetrahydro-α-naphthol, o-, m- and p-cresol, o-, m- and p-phenylphenol, o- m- and p-xylenols, the carvenols, symmetrical xylenol, thymol, o-, m- and p-nonylphenol, o-, m- and p-dodecyl phenol, and o-, m- and p-octyl phenol, o- and m-tert-butyl-p-hydroxy-anisole, p-n-decyloxy phenol, p-n-decyloxy cresol, nonyl n-decyloxy cresol, eugenol, isoeugenol, glyceryl monosalicylate, methyl-p-hydroxy-cinnamate, 4-benzyloxy-phenol, p-acetylaminophenol, p-stearyl-aminophenol, methyl - p - hydroxybenzoate, p-di-chlorobenzoyl-aminophenol and p-hydroxysalicyl anilide.

Exemplary polyhydric phenols are orcinol, propyl gallate, catechol, resorcinol, 4-octyl resorcinol, 4-dodecyl resorcinol, 4-octadecyl catechol, 4-isooctyl-phlorogluci-nol, pyrogallol, hexahydroxy benzene, 4-isohexylcatechol, 2,6-ditertiary-butyl resorcinol, 2,6-diisopropyl phloro-glucinol.

Exemplary polyhydric bisphenols are methylenebis-(2,6-di-tert-butyl-phenol),
2,2-bis-(4-hydroxy phenyl)propane,
methylene-bis(p-cresol),
4,4'-oxobis-(3-methyl-6-isopropyl phenol),
2,2'-oxobis-(4-dodecyl phenol),
4,4'-n-butylidenebis-(2-tertiary butyl-5-methylphenol),
4,4'-benzylidenebis-(2-tertiary-butyl-5-methylphenol),
4,4'-cyclohexylidenebis-(2-tertiary-butylphenol),
4,4'-thiobisphenol,
4,4'-thiobis(3-methyl-6-tertiary-butylphenol),
2,2'-thiobis(4-methyl-6-tertiary-butylphenol),
2,2'-methylenebis(4-methyl-6-(1'-methyl-cyclohexyl)-phenol),
2,6-bis(2'-hydroxy-3'-tertiary-butyl-5'-methylbenzyl)-4-methylphenol,
1,1,3-tris-(2'-methyl-4'-hydroxy-5'-tertiary butylphenyl) butane, and
4,4'-cyclohexylidene bis(2-cyclohexyl phenol).

The thiodipropionic acid ester has the following formula:

R₁OOCCH₂CH₂—S—CH₂CH₂COOY in which R₁ is an organic radical selected from the group consisting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of (a) hydrogen; (b) a second R radical R₂, which can be the same as or different from the R₁ radical; (c) a polymeric chain of $n$ thiodipropionic acid ester units:

XO[OCCH₂CH₂SCH₂CH₂COOXO]ₙ
OCCH₂CH₂—S—CH₂COOZ where Z is hydrogen, R₂ or M; $n$ is the number of thiodipropionic acid ester units in the chain; and X is a bivalent hydrocarbon group of the type of R₁; the value of $n$ can range upwards from 1, but there is no upper limit on $n$ except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule, the thiodipropionic ester has a total of from about ten to about sixty carbon aoms per sulfur atom.

Accordingly, the various thiodipropionic acid ester species coming within the above-mentioned categories within the general formula can be defined as follows:

(a)        R₁OOCCH₂CH₂SCH₂CH₂COOH (b)        R₁OOCCH₂CH₂SCH₂CH₂COOR₂

(c)  R₁O[OCCH₂CH₂SCH₂CH₂COOX—O]ₙ
                    OCCH₂CH₂SCH₂CH₂COOZ (d)       [R₁OOCCH₂CH₂SCH₂CH₂COO]₂M

In the above formulae R₁ and R₂, M, X and Z are the same as before. In the polymer (c), as in the other forms of thiodipropionic acid esters, the total number of carbon atoms per sulfur atom is within the range from about ten to about sixty.

The R radical of these esters is important in furnishing compatibility with the polypropylene. The Y radical is desirably a different radical, R₂ or M or a polymer, where R is rather low in molecular weight, so as to compensate for this in obtaining the optimum compatibility and non-volatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,2-propylene,

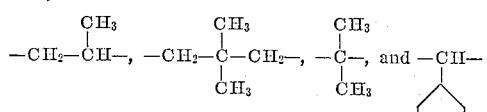

arylene radicals such as phenylene

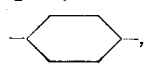

methylenephenylene

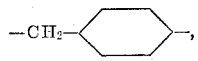

dimethylene phenylene,

and alicyclene radicals such as cyclohexylene

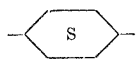

and cyclopentylene

As exemplary of the thiodipropionic acid esters which can be used, there can be mentioned the following: monolauryl thiodipropionic acid, dilauryl thiodipropionate, butyl stearyl thiodipropionate, di(2-ethylhexyl)-thiodipropionate, diisodecyl-thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

These esters are for the most part known compounds, but where they are not available, they are readily prepared by esterification of thiodipropionic acid and the corresponding alcohol.

When the combination of the 3-amino-1,2,4-triazole and pentaerythritol are used in conjunction with a polyvalent metal salt of an organic acid, the polyvalent metal salt of an organic acid will ordinarily have from about six to about twenty-four carbon atoms. The polyvalent metal can be any metal of Group II of the Periodic Table such as zinc, calcium, cadmium, barium, magnesium, and strontium. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carboxylic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

The hydrocarbon sulfides and polysulfides can contain one sulfur atom or two or more sulfur atoms linked in a polysulfide unit. Usually, the sulfides and polysulfides will not have more than fifty carbon atoms. They can be defined by the formula:

$$R(S)_n-R$$

wherein $n$ is the number of sulfur atoms and ranges from one to about six, and R is an organic radical having from one to about thirty carbon atoms, such as alkyl, aryl, alkaryl, aralkyl, and cycloalkyl. The following compounds are typical: dibutyl sulfide, didecyl sulfide, diphenyl sulfide, dibenzyl sulfide, butyl octyl sulfide, di-n-dodecyl trisulfide, ditertiary dodecyl disulfide, di-paratertiary butyl phenyl trisulfide, dibenzyl disulfide, dibenzyl tetra sulfide, and dibenzyl trisulfide.

Light stabilizers for olefin polymers can also be added, for example, 2-hydroxy benzophenones, o-hydroxyphenylbenzotriazoles, 1-dioxides of α,β-benzoisothiazolone and 1,3,5-triazines and nickel organophosphites as disclosed in application Ser. No. 487,614, now U.S. Pat. No. 3,395,112.

The stabilizer system of the invention comprises 3-amino-1,2,4-triazole and pentaerythritol, optionally in combination with at least one olefin polymer stabilizer, and preferably, two or more such stabilizers. It is well known that in the case of olefin polymers, combinations of stabilizers can be complementary, and can enhance the resistance of the olefin polymer to oxidative deterioration. Such enhanced stabilizing effectiveness when present in the olefin polymer stabilizer combination continues to be evidenced in the presence of the 3-amino-1,2,4-triazole and pentaerythristol.

Stabilizer systems of the invention comprising 3-amino-1,2,4-triazole and pentaerythritol and an olefin polymer stabilizer can be formulated and marketed as such, ready for use by the converter of the olefin polymer into useful products.

In another embodiment of the invention, as previously indicated, 3-amino-1,2,4-amino triazole and pentaerythritol can be combined with the olefin polymer. Such compositions are readily marketed by the polymer manufacturer as an olefin polymer which can be used in contact with copper, and can be combined with the usual olefin polymer stabilizers by the converter in the usual way, without any modification whatsoever, so as to obtain the benefits of the invention due to the presence in the formulation of the 3-amino-1,2,4-triazole and pentaerythritol. Such compositions have the special advantage that they can be processed using the usual techniques, and, in addition, the usual olefin polymer stabilizer systems will behave virtually in their normal way, even when the composition is in contact with copper.

The preferred stabilizer system of the invention comprises 3-amino-1,2,4-triazole and pentaerythritol and two olefin polymer stabilizers, a phenol, and a thiodipropionic acid ester. An additional fourth ingredient which is included in the preferred systems of the invention but which is not essential is an organic phosphite, and a fifth optional ingredient is a polyvalent metal salt of an organic acid. The olefin polymer stabilizers together give an enhanced stabilization which is not obtainable from any of them alone or in combinations of two with the 3-amino-1,2,4-triazole and pentaerythritol.

The combination of 3-amino-1,2,4-triazole and pentaerythritol is not an olefin polymer stabilizer. However, where the 3-amino-1,2,4-triazole and pentaerythritol are employed in conjunction with an olefin polymer stabilizer, such as a phenol, and a thiodipropionic acid ester, and the olefin polymer is in contact with copper, the polymer's resistance to embrittlement and reduction in melt viscosity at elevated temperatures can be almost as high as though the copper were not present. An organic phosphite and/or a polyvalent metal salt, employed in conjunction with the phenol and thiodipropionic acid ester and 3-amino-1,2,4-triazole and pentaerythritol, can further enhance resistance of the polymer to discoloration in the presence of copper. In many cases, an enhanced synergistic stabilizer activity is observed in such combinations.

The combination of 3-amino-1,2,4-triazole and pentaerythritol can minimize any catalytic effect of copper on the rate of degradation of the olefin polymer in the presence of olefin polymer stabilizers. Very small amounts can significantly reduce this effect. Amounts within the range from about 0.005 to about 10%, and preferably from about 0.1 to about 5%, by weight of the olefin polymer, are satisfactory. Of this, the 3-amino-1,2,4-triazole comprises from about 5 to about 95%, preferably from about 25 to about 75%, by weight of the stabilizer combination, and the pentaerythritol comprises from about 95 to about 5%, and preferably from about 75 to about 25%, by weight of the stabilizer combination.

The amount of total stabilizer including the olefin polymer stabilizer and the combination of the 3-amino-1,2,4-triazole and pentaerythritol is within the range from about 0.05 to about 10%, preferably from 0.1 to 5%, by weight of the olefin polymer. Of this, the olefin polymer stabilizer comprises from about 0.001 to about 5% by weight, and the combination of the 3-amino-1,2,4-triazole and pentaerythritol from about 0.05 to about 5% by weight. The preferred olefin polymer stabilizer comprises from about 0.025 to about 0.5% of a phenol, from about 0.05 to about 1% of a thiodipropionic acid ester, and optionally, from about 0.05 to about 1.25% of a phosphite, and from about 0.025 to about 0.75% of a polyvalent metal salt, when present; all these amounts are by weight of the olefin polymer.

Combinations of 3-amino-1,2,4-triazole and/or pentaerythritol and/or other olefin polymer stabilizers may be formulated as a simple mixture for incorporation in the polymer by the polymer manufacturer or by the converter. An inert organic solvent can be used to facilitate handling, if the ingredients do not form a homogeneous mixture or solution.

In such stabilizer formulations, the proportions of the stabilizer components are selected to provide stabilizer amounts within the above-stated ranges after combination with the olefin polymer. A two component combination of 3-amino-1,2,4-triazole and pentaerythritol contains from about 5 to about 95% 3-amino-1,2,4-triazole and from about 95 to about 5% pentaerythritol. With such a combination there can be combined an olefin polymer stabilizer, in the proportion of from about 20% to about 80% olefin polymer stabilizer and from about 80% to about 20% of the 3-amino-1,2,4-triazole-pentaerythritol combination. Such an olefin polymer stabilizer can be selected from the group consisting of phenols, organic phosphites, thiodipropionic acid esters, polyvalent metal salts of organic acids, and hydrocarbon sulfides and polysulfides, the stabilizer being compatible with polypropylene and having a low vapor pressure at olefin polymer working temperatures.

Combinations of olefin polymer stabilizers can be used, in such compositions. Exemplary are olefin polymer stabilizer combinations consisting essentially of from about 0.5 to about 20% of a phenol and from about 1.2 to about 35% of a thiodipropionic acid ester, and optionally, also including from about 1.2% to about 45% of an organic phosphite, and optionally, also including from about 0.5% to about 25% of a polyvalent metal salt of an organic acid.

Polypropylene solid polymer can be defined in a manner to differentiate it from other polyolefins as having a density within the range of from 0.86 to 0.91, and a melting point above 150° C. The stabilizer of the invention is applicable to all such polypropylenes, as distinguished from polypropylenes in the liquid form or in semiliquid or gel-like forms, such as are used as greases and waxes.

The stabilizer system of the invention is applicable to polypropylenes prepared by any of the various procedures, for the molecular weight and tacticity are not factors affecting this stabilizer. Isotactic polypropylene, available commercially under the trade name Profax, Escon and Olefane and having a softening or hot-working temperature of about 350° F., is an example of a sterically regular polypropylene polymer.

Mixtures of polypropylene with other compatible polymers and copolymers of propylene with copolymerizable monomers also can be stabilized in accordance with this invention. For example, mixtures of polyethylene and polypropylene, and copolymers of propylene and ethylene which contain a sufficient amount of propylene to present the instability problem that is resolved by the stabilizer of the invention, may be stabilized by the addition of oxalic acid, alone or in combination with other polypropylene stabilizers.

The stabilizer systems of the invention may also be used with polyolefins higher than polypropylene, such as polybutylene, polyisobutylene and 4-methyl-pentene-1 polymer.

The stabilizer system is incorporated in the polymer in suitable mixing equipment, such as a mill or a Banbury mixer. If the polypropylene has a melt viscosity which is too high for the desired use, the polypropylene can be worked until its melt viscosity has been reduced to the desired range before addition of the stabilizer. However, polypropylenes in a range of workable melt viscosities are now available. Mixing is continued until the mixture is substantially uniform. The resulting composition is then removed from the mixing equipment and brought to the size and shape desired for marketing or use.

The stabilized polypropylene can be worked into the desired shape, such as by milling, calendering, extrusion or injection molding or fiber-forming. In such operations, it will be found to have a considerably improved resistance to reduction in melt viscosity during the heating, as well as a better resistance to discoloration and embrittlement on aging and heating.

The following examples in the opinion of the inventor represent preferred embodiments of the stabilizer compositions and olefin polymer compositions of the invention.

EXAMPLE 1

Polypropylene compositions were prepared, stabilized by a combination of 3-amino-1,2,4-triazole and pentaerythritol and known polypropylene stabilizers, and were evaluated for their resistance to degradation due to prolonged exposure to elevated temperatures in the presence of copper.

The base olefin polymer composition tested was as follows:

Table I

| | Parts by weight |
|---|---|
| Polypropylene (AVISUN) | 100 |
| 1,1,3 - tris(2'-methyl-4'-hydroxy-5'-tertbutylphenyl) butane | 0.08 |
| Distearyl thiodipropionate | 0.52 |
| Copper powder | 1.0 |

To one sample (Example 1), there was added a combination of 0.15 part 3-amino-1,2,4-triazole and 0.25 part pentaerythritol. To another sample (Control B), there was added 0.15 part 3-amino-1,2,4-triazole.

The components listed were mixed on a two-roll mill and fluxed for five minutes at 170±2° C. and sheeted off to form milled sheets. Pieces cut from the milled sheets were compression molded at 190° C. for five minutes to give 6 x 6 inch slabs 20 mils thick. The molded samples were heated flat on aluminum foil in an air-circulating oven at 140° C. and 150° C. Samples were removed periodically and examined for discoloration and cracking which constitute failure.

Table II below sets out the results of the test.

TABLE II

| Example No. | Compounds added | Time to failure (Hours) at— | |
|---|---|---|---|
| | | 140° C. | 150° C. |
| 1 | 3-amino-1,2,4-triazole (0.15 part), pentaerythritol (0.25 part). | 1,278 | 429 |
| Control: | | | |
| A | None | <22 | <22 |
| B | 3-amino-1,2,4-triazole (0.15 part) | 548 | 308 |

The improvement in resistance of the polypropylene to degradation on long-term exposure to elevated temperatures is evident.

EXAMPLES 2 TO 4

Polypropylene compositions were prepared, especially formulated for use in contact with copper, by the incorporation of the 3-amino-1,2,4-triazole-pentaerythritol combination of the invention. Such compositions can be marketed as such, and when mixed with polypropylene stabilizers will have an enhanced resistance to copper-catalyzed degradation in physical properties.

The 3-amino-1,2,4-triazole-pentaerythritol combination of the invention was evaluated for the effect of each component thereof, taken singly, and in a pair, in enhancing the resistance of polypropylene to copper-catalyzed oxidative deterioration.

The 3-amino-1,2,4-triazole annd pentaerythritol were weighed, mixed, and dispersed in polypropylene (Profax 6523). The mixtures listed in Table III below were mixed and fluxed on a two-roll mill at 170±2° C. and then there was added 1.0 part copper powder, after which the composition was fluxed for five minutes and sheeted off to form milled sheets. Pieces cut from the milled sheet were compression-molded at 190° C. for five minutes to give 6 x 6 inch slabs 20 mils thick. The molding samples were heated flat on aluminum foil in an air-circulating oven at 160° C. Samples were removed periodically and examined for discoloration and cracking which constitute failure.

Table III sets out the results of the oven ageing tests.

TABLE III

| | Parts | | | | | |
|---|---|---|---|---|---|---|
| | Control | | | Example | | |
| Sample Number | C | D | E | 2 | 3 | 4 |
| Polypropylene (Profax 6523) | 100 | 100 | 100 | 100 | 100 | 100 |
| Copper powder | 1.0 | 1.0 | 1.0 | 1.0 | 1.0 | 1.0 |
| 3-amino-1,2,4-triazole | | 2.0 | | 1.5 | 1.0 | 0.5 |
| Pentaerythritol | | | 2.0 | 0.5 | 1.0 | 1.5 |
| Oven ageing (hours) at 160° C | 4 | 165 | 70 | 238 | 333 | 309 |

The data set forth in Table III show that the combination of the 3-amino-1,2,4-triazole and pentaerythritol was substantially superior to either component taken alone in enhancing the resistance of polypropylene to copper-catalyzed degradation.

EXAMPLE 5

4-methyl-pentene-1 polymer compositions were prepared, stabilized with a combination of 3-amino-1,2,4-triazole and pentaerythritol and known polyolefin stabilizers, and evaluated for their resistance to degradation due to long exposure to elevated temperatures in the presence of copper.

The compounds listed in Table IV were dry blended by mixing stabilizers dissolved in benzene with powdered 4-methyl-pentene-1 polymer (TPX™) and evaporating the benzene. The powder blends were then compression molded at 260° C. for three minutes to give 6 x 6 inch slabs 20 mils thick. The molded slabs were cut into strips about one inch wide and samples were heated flat on aluminum foil in an air-circulating oven at 150° C. Samples were removed and examined periodically for discoloration and embrittlement which constituted failure.

TABLE IV

| | Control | | | | Example |
|---|---|---|---|---|---|
| Sample Number | F | G | H | J | 5 |
| 4-methylpentene-1-polymer | 100 | 100 | 100 | 100 | 100 |
| Dilauryl thiodipropionate | 0.25 | | | | |
| Distearyl thiodipropionate | | 0.52 | 0.26 | 0.26 | 0.26 |
| 3-amino-1,2,4-triazole | 0.25 | | 0.3 | | 0.15 |
| 1,1,3-tris(2'-methyl-4'-hydroxy-5'-tert-butyl phenyl)butane | | 0.08 | 0.04 | 0.04 | 0.04 |
| Pentaerythritol tetra(3,5-di-t-butyl-4-hydroxy-phenyl propionate) | 0.25 | | | 0.3 | |
| Pentaerythritol | | | | 0.3 | 0.15 |
| Copper powder | 1.0 | 1.0 | 1.0 | 1.0 | 1.0 |
| Oven ageing at 150° C., hours to failure | 452 | 452 | 713 | 375 | 929 |

The data set forth in Table IV show that the combination of 3-amino-1,2,4-triazole and pentaerythritol of Example 5 was substantially superior to either component taken alone in enhancing the resistance of methyl pentene polymer to copper-catalyzed degradation.

EXAMPLE 6

4 - methyl-pentene-1 polymer compositions were prepared, stabilized with a combination of 3-amino-1,2,4-triazole and pentaerythritol and known polyolefin stabilizers, and evaluated for their resistance to degradation due to long exposure to elevated temperatures in the presence of copper.

The compounds listed in Table V were dry-blended by mixing stabilizers dissolved in benzene with powdered 4-methyl pentene-1 polymer (TPX™) and evaporating the benzene. The powder blends were then compression molded at 260° C. for three minutes to give 6 x 6 inch slabs 20 mils thick. The molded slabs were cut into strips about one inch wide and samples were heated flat on aluminum foil in an air-circulating oven at 170° C. Samples were removed and examined periodically for discoloration and embrittlement which constituted failure.

TABLE V

| | Control | | | | Example |
|---|---|---|---|---|---|
| Sample Number | F | G | H | J | 6 |
| 4-methylpentene-1 polymer | 100 | 100 | 100 | 100 | 100 |
| Dilauryl thiodipropionate | 0.25 | | | | |
| Distearyl thiodipropionate | | 0.52 | 0.26 | 0.26 | 0.26 |
| 3-amino-1,2,4-triazole | 0.25 | | 0.3 | | 0.2 |
| 1,1,3-tris(2'-methyl-4'-hydroxy-5'-tert-butylphenyl)butane | | 0.08 | 0.04 | 0.04 | 0.04 |
| Pentaerythritol tetra(3,5-di-t-butyl-4-hydroxyphenylpropionate) | 0.25 | | | | |
| Pentaerythritol | | | | 0.3 | 0.1 |
| Copper powder | 1.0 | 1.0 | 1.0 | 1.0 | 1.0 |
| Oven ageing at 170° C., hours to failure | 137 | 112 | 169 | 87 | 192 |

The data in Table V shows the advantage of the combination of 3-amino-1,2,4-triazole and pentaerythritol in preventing copper catalyzed degradation in 4-methyl-pentene-1 polymers.

EXAMPLES 7 TO 15

Olefin polymer stabilizer compositions were prepared, especially formulated for use with polypropylene in contact with copper, comprising the 3-amino-1,2,4-triazole-pentaerythritol combination of the invention, with an olefin polymer stabilizer combination of a thiodipropionate and a phenol. The 3-amino-1,2,4-triazole, pentaerythritol and olefin polymer stabilizers were blended together in the proportions shown in Table VII. Such blends can be marketed in this form, and when mixed with polypropylene or other olefin polymers will give stabilized polypropylene or other olefin polymer compositions having enhanced resistance to copper-catalyzed degradation in physical properties.

A group of nine polypropylene compositions was prepared, using these stabilizer combinations. The quantities of each component of the stabilizers, expressed both as parts by weight per 100 parts by weight of polypropylene and as percent by weight of the blend of 3-amino-1,2,4-triazole, pentaerythritol and olefin polymer stabilizers, are shown in Table VII together with the results of oven heat stability tests at 140° C. and 150° C. carried out with samples prepared in the manner described in Example 1.

TABLE VI

| Example | \multicolumn{9}{c}{Parts by weight} | | | | | | | | |
|---|---|---|---|---|---|---|---|---|---|
| | 7 | 8 | 9 | 10 | 11 | 12 | 13 | 14 | 15 |
| Polypropylene (AVISUN) homopolymer | 100 | 100 | 100 | 100 | 100 | 100 | 100 | 100 | 100 |
| Copper powder | 1.0 | 1.0 | 1.0 | 1.0 | 1.0 | 1.0 | 1.0 | 1.0 | 1.0 |
| Distearylthiodipropionate | 0.11 | 0.30 | 0.65 | 0.21 | 0.48 | 0.20 | 0.31 | 0.17 | 0.43 |
| 1,1,3-tris(2'-methyl-4'-hyroxy-5'-tertbutylphenyl) butane | 0.015 | 0.075 | 0.10 | 0.04 | 0.08 | 0.05 | 0.065 | 0.02 | 0.07 |
| 3-amino-1,2,4-triazole | 0.125 | 0.125 | 0.083 | 0.125 | 0.095 | 0.375 | 0.083 | 0.374 | 0.312 |
| Pentaerythritol | 0.250 | 0.250 | 0.167 | 0.125 | 0.095 | 0.375 | 0.042 | 0.186 | 0.188 |
| Percent distearylthiodipropionate in blend | 22 | 40 | 65 | 42 | 64.0 | 20 | 62 | 22.7 | 43.0 |
| Percent 1,1,3-tris(2'-methyl-4'-hydroxy-5'-tertbutylphenyl) butane | 3 | 10 | 10 | 8 | 10.6 | 5 | 13.0 | 2.7 | 7.0 |
| Percent 3-amino-1,2,4-triazole | 25 | 16.7 | 8.3 | 25 | 12.7 | 37.5 | 16.6 | 49.8 | 31.2 |
| Percent pentaerythritol | 50 | 33.3 | 16.7 | 25 | 12.7 | 37.5 | 8.4 | 24.8 | 18.8 |
| 150° C. test, hours | 70 | 166 | 238 | 118 | 238 | 356 | 70 | 70 | 502 |
| 140° C. test, hours | 238 | 849 | 1,041 | 310 | 1,498 | 2,049 | 262 | 1,281 | 1,996 |

The results of the oven aging tests show that good resistance to copper-catalyzed degradation can be obtained with stabilizers according to the invention, that the extent of improvement is directly related to the amount of stabilizers used, and that good protection can be obtained using relative proportions of the components within the desired ranges.

Having regard to the foregoing disclosure, the following is claimed as the inventive and patentable embodiments thereof:

1. A composition useful in the enhancement of the resistance of olefin polymers to copper-catalyzed oxidative deterioration, consisting essentially of from 5 to about 95% 3-amino-1,2,4-triazole and from about 95 to about 5% pentaerythritol.

2. A stabilizer combination useful in the enhancement of the resistance of olefin polymers to copper-catalyzed oxidative deterioration, consisting essentially of from about 20 to about 80% of the composition as defined in claim 1 and from about 80 to about 20% of at least one olefin polymer stabilizer, selected from the group consisting of phenols, organic phosphites, thiodipropionic acid esters, polyvalent metal salts of organic acids, and hydrocarbon sulfides and polysulfides, the stabilizer being compatible with polypropylene and having a low vapor pressure at olefin polymer working temperatures.

3. A stabilizer combination in accordance with claim 2, wherein the olefin polymer stabilizer is a phenol.

4. A stabilizer combination in accordance with claim 2, wherein the olefin polymer stabilizer is a thiodipropionic acid ester.

5. A stabilizer combination in accordance with claim 2, comprising from 0.5 to about 20% of a phenol and from about 1.2 to about 35% of a thiodipropionic acid ester.

6. A stabilizer combination in accordance with claim 5, including from about 1.2% to about 45% of an organic phosphite.

7. A stabilizer combination in accordance with claim 2, including an organic phosphite.

8. A stabilizer combination in accordance with claim 6, including from about 0.5% to about 25% of a polyvalent metal salt of an organic acid.

9. Olefin polymer compositions which when combined with one or more olefin polymer stabilizers have an enhanced resistance to copper-catalyzed degradation in physical properties, consisting essentially of an α-mono-olefin polymer and from about 0.005 to about 10% by weight of the olefin polymer of a combination of from about 5 to about 95% of 3-amino-1,2,4-triazole and from about 95 to about 5% of pentaerythritol.

10. An olefin polymer composition in accordance with claim 9, wherein the olefin polymer is a propylene polymer.

11. An olefin polymer composition in accordance with claim 10, wherein the propylene polymer is polypropylene.

12. An olefin polymer composition in accordance with claim 9, wherein the olefin polymer is 4-methyl-pentene-1 polymer.

13. An olefin polymer composition in accordance with claim 9, including from about 0.001 to about 5% by weight of the olefin polymer of at least one olefin polymer stabilizer.

14. An olefin polymer composition in accordance with claim 13, wherein the olefin polymer stabilizer is a phenol.

15. An olefin polymer composition in accordance with claim 13, wherein the olefin polymer stabilizer is a thiodipropionic acid ester.

16. An olefin polymer composition in accordance with claim 13, comprising from about 0.025% to about 0.5% of a phenol and from about 0.05% to about 1% of a thiodipropionic acid ester.

17. An olefin polymer composition in accordance with claim 13, comprising from about 0.25% to about 0.5% of a phenol, from about 0.05% to about 1% of a thiodipropionic acid ester, and from about 0.05% to about 1.25% of an organic phosphite.

18. An olefin polymer composition in accordance with claim 13, comprising from about 0.025% to about 0.5% of a phenol, from about 0.05% to about 1% of a thiodipropionic acid ester, from about 0.05% to about 1.25% of an organic phosphite and from about 0.025% to about 0.75% of a polyvalent metal salt of an organic acid.

19. An olefin polymer composition in accordance with claim 13, comprising from about 0.05% to about 1% of a thiodipropionic acid ester and from about 0.05% to about 1.25% of an organic phosphite.

References Cited
UNITED STATES PATENTS 2,985,619  5/1961  Roos et al. ———————— 260—45.9
3,367,907  2/1968  Hansen ———————————— 260—45.8

DONALD E. CZAJA, Primary Examiner

R. A. WHITE, Assistant Examiner

U.S. Cl. X.R.

117—232; 252—401; 260—23, 45.7, 45.75, 45.85, 45.95